Nov. 13, 1951

H. A. PETSCH 2,574,756

MEANS FOR INJECTING A FLOWABLE SUBSTANCE INTO A STREAM OF LIQUID

Filed Feb. 4, 1949

Inventor
Harold A. Petsch
Harry W. Kilgore
Attorney

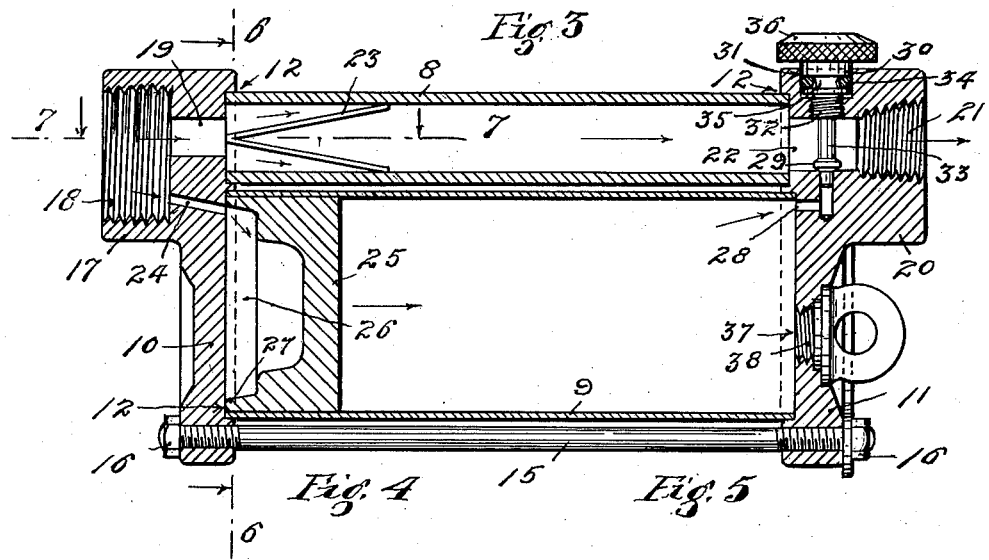
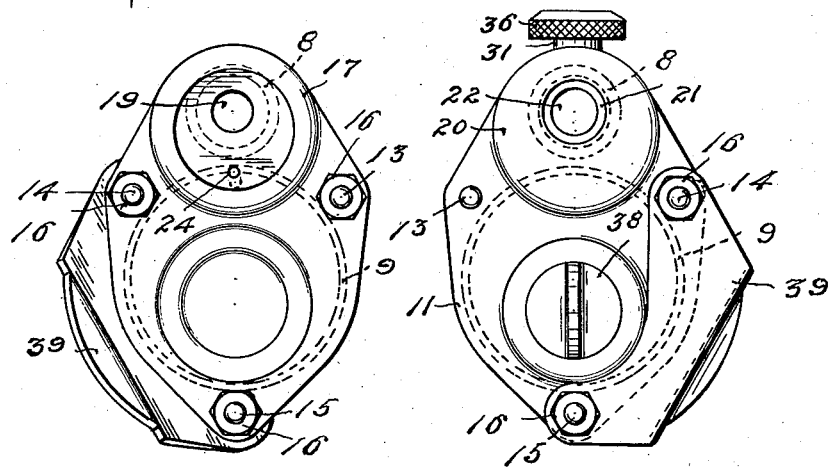
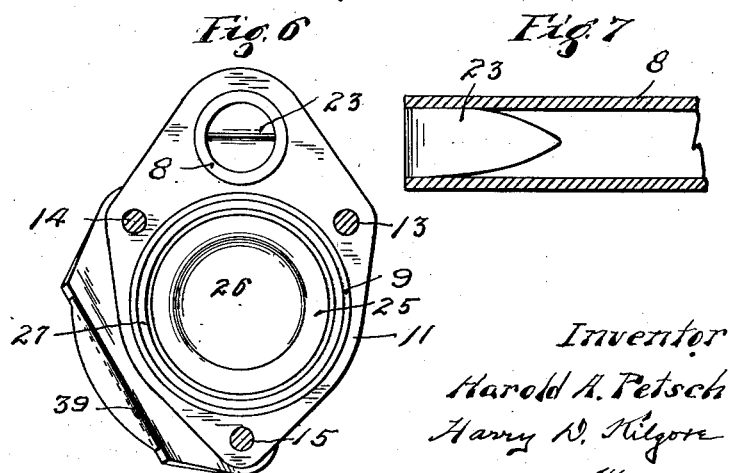

Patented Nov. 13, 1951

2,574,756

UNITED STATES PATENT OFFICE 2,574,756

MEANS FOR INJECTING A FLOWABLE SUBSTANCE INTO A STREAM OF LIQUID

Harold A. Petsch, Minneapolis, Minn.

Application February 4, 1949, Serial No. 74,667

1 Claim. (Cl. 299—84)

My present invention relates to improvements in devices for injecting a flowable substance into a stream of liquid.

The object of this invention is to commingle a flowable substance with a fluid vehicle moving under pressure by by-passing a small portion of the fluid vehicle to inject a small stream of the substance into the main body of the fluid vehicle.

To the above end, generally stated, the invention consists of the novel devices and combination of devices hereinafter described and defined in the claim.

In the accompanying drawings, which illustrate the invention, like characters indicate like parts throughout the several views.

Referring to the drawings:

Fig. 3 is a view in longitudinal vertical section taken centrally through the device;

Figs. 4 and 5 are inner and outer end elevational views of the device, respectively;

Fig. 6 is a view partly in end elevation and partly in section taken on the line 6—6 of Fig. 3; and Fig. 7 is a view partly in plan and partly in section taken on the line 7—7 of Fig. 3.

Figure 1:
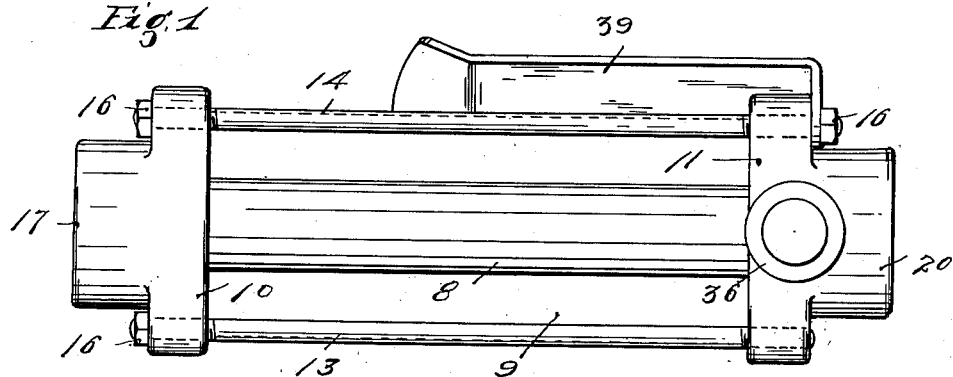
Fig. 1 is a plan view of the improved device.
Figure 2:
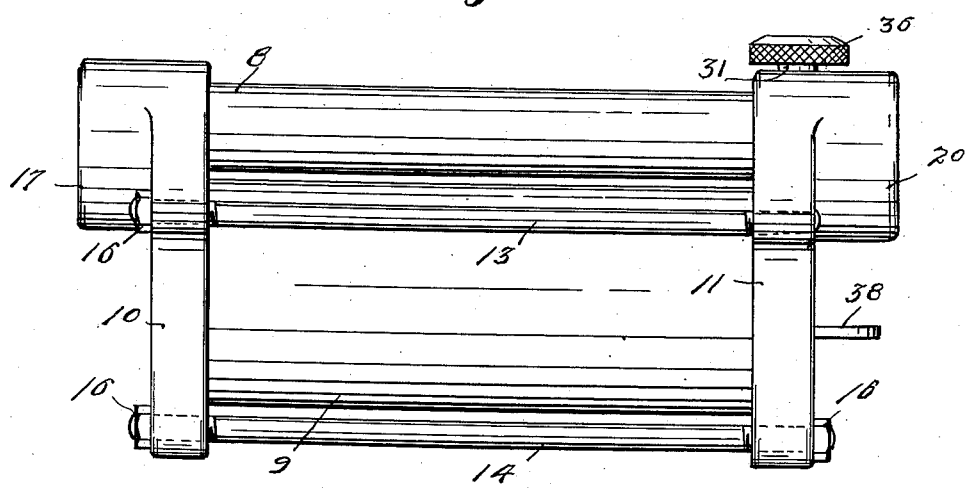
Fig. 2 is a side elevational view of the same.

The numeral 8 indicates a conduit in the form of a cylindrical tube and under this tube is a cylinder 9 also in the form of a tube. The cylinder 9 is of a much larger diameter than the conduit 8, extends parallel thereto and is of the same length and affords a reservoir, as will presently appear.

An inner head 10 and an outer head 11 are applied to opposite ends of the conduit 8 and the cylinder 9. These heads 10 and 11 have in their inner sides annular recesses 12 into which the end portions of the conduit 8 and cylinder 9 are snugly fitted. The heads 10 and 11 are connected by a pair of side tie-rods 13 and 14 and a bottom tie-rod 15 that have screw thread end portions. The end portions of all of the tie-rods 13, 14 and 15 extend loosely through bores in the heads 10 and 11 and nuts 16 are applied to their threaded end portions, with the exception of the outer end portion of the rod 13 which has threaded engagement with the head 11. The nuts 16 impinge the outer sides of the heads 10 and 11 and hold the tie-rods 13, 14 and 15 with said heads pressed against the ends of the conduit 8 and cylinder 9 to form tight joints therewith.

Integral with the head 10, at its outer side, is a cylindrical coupling member 17 having internal screw-threads 18 for attaching a hose or pipe, not shown, that leads from a suitable fluid supply under pressure, to the device. A port 19 of large conducting capacity in the head 10 affords a communicating passageway that leads from the coupling member 17 to the conduit 8.

On the outer side of the head 11 is an integral cylindrical coupling member 20 having internal screw-threads 21 for attaching a nozzle, hose or pipe, not shown, to the device. A port 22 in the head 11 of a larger diameter than the port 19 affords a passageway that leads from the conduit 8 to the coupling member 20. Within the conduit 8, at its inner end portion, is a reducing valve 23 of the butterfly type. This valve 23 is secured at its apex to the conduit 8 and arranged to open by fluid pressure through the port 19. When there is no pressure on the valve 23, it completely closes the conduit 8. Formed in the head 10 is a port 24 that leads from the coupling member 18 into the cylinder 9. This port 24 has a small conducting capacity relative to the port 19.

Within the cylinder 9 is a floating rubber piston 25, the back of which is recessed at 26 to form, in part, a thin annular ring 27 which, when fluid pressure is directed into the cylinder 9 from the port 24, is expanded against the internal wall of said cylinder and forms a tight joint therewith. Formed in the head 11 is a port 28 that leads from the cylinder 9 into the port 22 and is of substantially the same conducting capacity as the port 24. The port 28 is in the form of a right angle and its intake end portion is substantially parallel to the axis of the cylinder 9, and its discharge end portion extends radially relative to the port 22.

A needle valve 29 is provided for closing the port 28 or for varying the discharge of fluid therefrom. This needle valve 29 has a cylindrical body member 30 turnably mounted in a recess 31 in the top of the head 11. On the under side of the body member 30 is a member 32 of a reduced diameter and that has screw-threaded engagement with the head 11. Depending from the member 32 is a stem 33 that extends radially through the port 22 and into the port 28 which guides said stem. A rubber ring 34 held in a circumferentially extended groove 35 in the body member 30 contacts the wall of the recess 31 and forms a tight joint between said body member and the head 11. On the upper end of the body member 30 is a knurled finger-piece 36, by which said body member may be turned to raise or lower the valve 29 relative to the port 22.

In the head 11 is a filling opening 37 normally closed by a finger-piece equipped screw plug 38.

In general use, the device is attached to a belt worn by an operator by a clip 39 secured to the head 11 by the tie-rods 13 and 14.

The cylinder 9 is for holding a substance to be commingled with a stream of liquid moving through the conduit 8. Obviously, fluid by-passed through the port 24 slowly moves the piston 25 in the cylinder 9 and forces the substance in said cylinder in a small stream through the port 28 and into the main body of the liquid passing through the port 22.

While the above described device is intended for general use, it is especially well adapted for commingling liquid soap or a liquid fertilizer with a stream of water under pressure and spraying the same from the device.

The drawings illustrate a commercial form of the invention described, but it will be understood that the same is capable of certain modifications as to details of construction, arrangement and combination of parts within the scope of the invention herein disclosed.

What I claim is:

In a device of the class described, a tube and a cylinder of substantially the same length and parallel, an inner head and an outer head having in their opposing faces recessed seats in which the end portions of the tube and the cylinder are mounted, said heads affording closures for the tube and the cylinder at the ends thereof, tie-rods connecting the heads and holding the same clamped onto the ends of the tube and the cylinder, an intake coupling and a discharge coupling on the inner and outer heads, respectively, said couplings being in the form of bosses substantially axially aligned with the tube, an intake communicating passage between the intake coupling and the tube and a discharge communicating passageway between the tube and the discharge coupling, said passageways being of large conducting capacity, a normally closed automatic reducing valve in the tube, a free floating piston in the cylinder, an intake port in the inner head leading from the intake coupling into the cylinder back of the piston, a discharge port in the outer head leading from the cylinder forward of the piston into the discharge passageway, said ports being of small conducting capacity relative to the passageways, a manually operated valve for closing the discharge port, and a normally closed filling opening in the outer head.

HAROLD A. PETSCH.

REFERENCES CITED

The following references are of record in the file of this patent:

UNITED STATES PATENTS

| Number | Name | Date |
|---|---|---|
| 1,241,551 | Preston et al. | Oct. 2, 1917 |
| 1,665,725 | Aeby | Apr. 10, 1928 |
| 1,708,907 | Spencer | Apr. 9, 1929 |
| 2,109,628 | Alban et al. | Mar. 1, 1938 |
| 2,292,003 | Yant et al. | Aug. 4, 1942 |
| 2,323,618 | Ottoson | July 6, 1943 |

FOREIGN PATENTS

| Number | Country | Date |
|---|---|---|
| 15,458 (of 1912) | Great Britain | July 2, 1913 |